(12) United States Patent
Uchida et al.

(10) Patent No.: US 12,531,414 B2
(45) Date of Patent: Jan. 20, 2026

(54) ELECTRONIC DEVICE, CHARGE CONTROL METHOD AND STORAGE MEDIUM

(71) Applicant: Casio Computer Co., Ltd., Tokyo (JP)

(72) Inventors: Shuhei Uchida, Tokyo (JP); Takashi Ito, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 157 days.

(21) Appl. No.: 18/532,931

(22) Filed: Dec. 7, 2023

(65) Prior Publication Data

US 2024/0204521 A1 Jun. 20, 2024

(30) Foreign Application Priority Data

Dec. 19, 2022 (JP) .................. 2022-202022

(51) Int. Cl.
| | | |
|---|---|---|
| *G06F 1/00* | (2006.01) | |
| *G04C 10/02* | (2006.01) | |
| *G04G 19/00* | (2006.01) | |
| *G06F 1/26* | (2006.01) | |
| *H02J 3/00* | (2006.01) | |
| *H02J 3/46* | (2006.01) | |
| *H02J 7/00* | (2006.01) | |
| *H02J 7/35* | (2006.01) | |
| *H02J 50/00* | (2016.01) | |
| *H02J 50/10* | (2016.01) | |

(Continued)

(52) U.S. Cl.
CPC ............. *H02J 3/0075* (2020.01); *G04C 10/02* (2013.01); *G04G 19/00* (2013.01); *G06F 1/263* (2013.01); *H02J 3/46* (2013.01); *H02J 7/0048* (2020.01); *H02J 7/00712* (2020.01); *H02J 7/35* (2013.01); *H02J 50/001* (2020.01); *H02J 50/10* (2016.02); *G06F 1/3203* (2013.01); *H01Q 1/273* (2013.01); *H02J 2300/24* (2020.01)

(58) Field of Classification Search
CPC ........ G04C 10/02; G04G 19/00; G06F 1/263; H02J 3/46; H02J 7/0048; H02J 7/00712; H02J 7/35; H02J 50/001; H02J 50/10; H02J 2300/24; H02J 7/0047; H02J 7/0029; H02J 50/20; H01Q 1/273; H01M 10/44
USPC ...................................................... 713/300
See application file for complete search history.

(56) References Cited

U.S. PATENT DOCUMENTS 8,971,799 B2 3/2015 Hamada
9,444,521 B2 9/2016 Hamada
(Continued)

FOREIGN PATENT DOCUMENTS

JP 2009253649 A 10/2009
JP 5247215 B2 7/2013
(Continued)

*Primary Examiner* — Volvick Derose
(74) *Attorney, Agent, or Firm* — Seed Intellectual Property Law Group LLP

(57) ABSTRACT

An electronic device including an antenna which is used for near field communication and converts to electrical power a magnetic field generated when near field communication is performed with an external device, a battery which is chargeable by at least part of the electrical power, and a processor which determines whether or not a predetermined condition has been satisfied, and controls charge of the battery by the part of the electrical power on basis of a result of the determination.

19 Claims, 5 Drawing Sheets

(51) Int. Cl.
*G06F 1/3203* (2019.01)
*H01Q 1/27* (2006.01)

(56) References Cited

U.S. PATENT DOCUMENTS

| | | | |
|---|---|---|---|
| 11,979,111 B2* | 5/2024 | Jang | H02J 7/35 |
| 2010/0311327 A1* | 12/2010 | Hamada | H04B 5/26 |
| | | | 455/41.1 |
| 2015/0097445 A1* | 4/2015 | Tsukamoto | H04B 5/77 |
| | | | 307/104 |
| 2015/0171933 A1 | 6/2015 | Hamada | |
| 2015/0180270 A1* | 6/2015 | Takano | H02J 50/40 |
| | | | 320/103 |
| 2016/0190856 A1* | 6/2016 | Baek | H04W 4/80 |
| | | | 320/108 |
| 2016/0342140 A1* | 11/2016 | Baba | G04R 20/06 |
| 2017/0090035 A1* | 3/2017 | Shingyoji | G01S 19/05 |
| 2018/0175636 A1* | 6/2018 | Choi | G06F 1/3212 |
| 2019/0369711 A1* | 12/2019 | Wang | H04W 24/02 |
| 2020/0021121 A1* | 1/2020 | Lee | H02J 7/0036 |
| 2021/0044157 A1* | 2/2021 | Kawamae | H02J 50/60 |
| 2022/0077722 A1* | 3/2022 | Seo | H02J 7/007192 |

FOREIGN PATENT DOCUMENTS

| | | | |
|---|---|---|---|
| JP | 2016226230 A | 12/2016 | |
| JP | 2017169377 A | 9/2017 | |
| JP | 2018066756 A | 4/2018 | |
| JP | 6589973 B2 | 10/2019 | |
| JP | 6752597 B2 | 9/2020 | |
| JP | 2020184877 A | 11/2020 | |
| JP | 7029490 B2 | 3/2022 | |

* cited by examiner

ELECTRONIC DEVICE, CHARGE CONTROL METHOD AND STORAGE MEDIUM

CROSS-REFERENCE TO RELATED APPLICATION

This application is based upon and claims the benefit of priority from the prior Japanese Patent Application No. 2022-202022, filed Dec. 19, 2022, the entire contents of which are incorporated herein by reference.

BACKGROUND OF THE INVENTION

1. Field of the Invention

The present invention relates to an electronic device, a charge control method and a storage medium.

2. Description of the Related Art

Some of the conventional electronic wristwatches (electronic devices) have a solar charge system. However, this solar charge system is inconvenient in that the amounts of charge in cloudy conditions are low, and the user has to take time to find a place of sunlight for battery charge when the battery of the wristwatch is out of charge by the wristwatch being untouched for a long period of time. Also, Japanese Patent Application Laid-Open (Kokai) Publication No. 2018-066756 discloses a technique of using, in addition to this solar charge system, a wireless charge system where a battery is charged by surplus electrical power that can be drawn during NFC (Near Field Communication) data communication between a wristwatch and a reader/writer device.

SUMMARY OF THE INVENTION

An embodiment of the present invention is an electronic device comprising: an antenna which is used for near field communication and converts to electrical power a magnetic field generated when near field communication is performed with an external device; a battery which is chargeable by at least part of the electrical power; and a processor which determines whether or not a predetermined condition has been satisfied, and controls charge of the battery by the part of the electrical power on basis of a result of the determination.

Another embodiment of the present invention is a charge control method by a processor of an electronic device, comprising: converting to electrical power a magnetic field generated when near field communication is performed with an external device; and determining whether or not a predetermined condition has been satisfied, and controlling charge of a battery by at least part of the electrical power on basis of a result of the determination.

Another embodiment of the present invention is a non-transitory computer-readable storage medium having stored thereon a program that is executable by a processor of an electronic device which performs near field communication with an external device, the program being executable by the processor to actualize functions comprising: determining whether or not a predetermined condition has been satisfied, and controlling charge of a battery by at least part of electrical power acquired by conversion of a magnetic field generated when the near field communication is performed, on basis of a result of the determination.

DETAILED DESCRIPTION OF THE PREFERRED EMBODIMENTS

An embodiment of the present invention will hereinafter be described with reference to the drawings.

Figure 1:
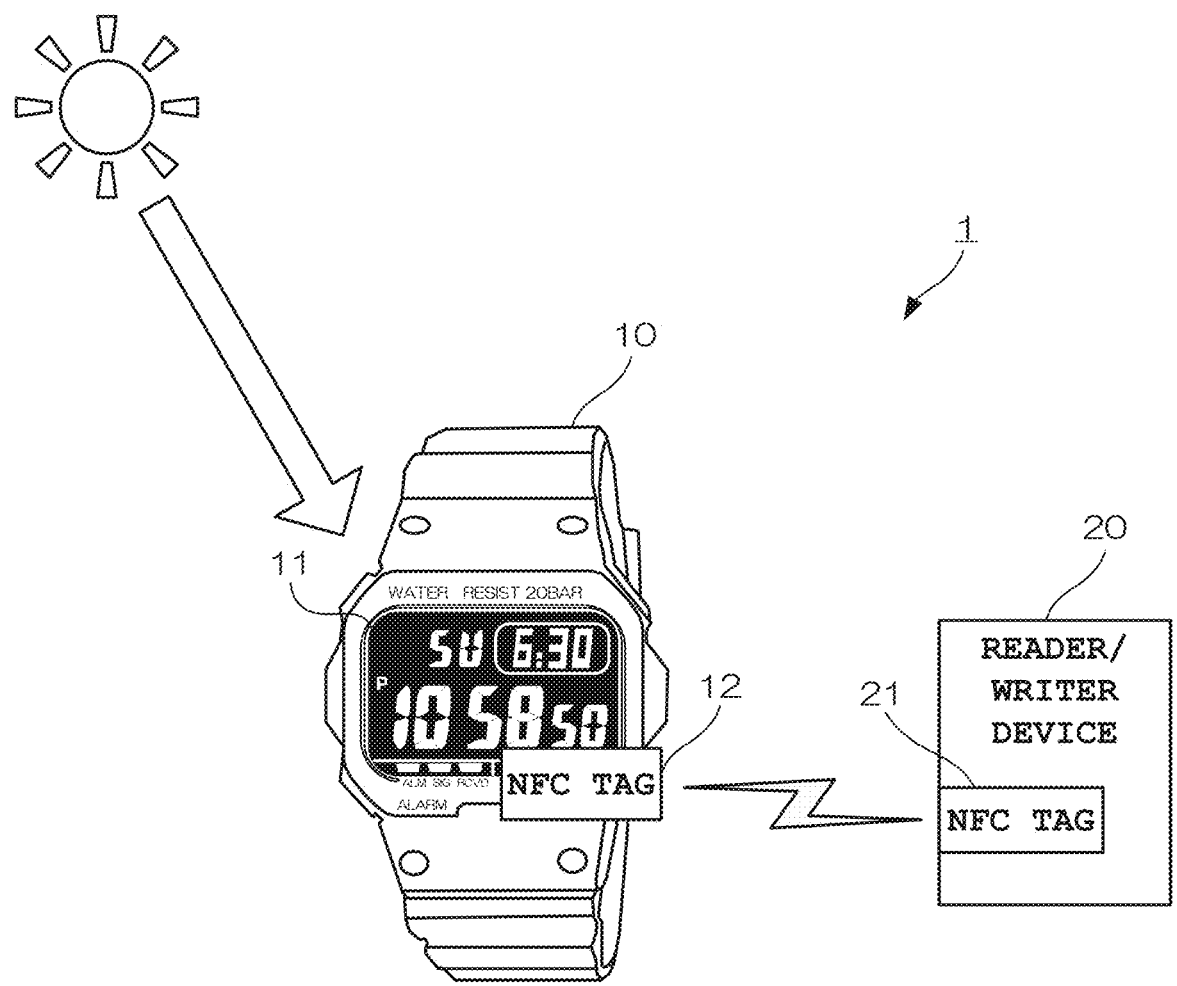
FIG. 1 is a schematic diagram showing the configuration of a charge control system 1 according to an embodiment of the present invention.

FIG. 1 is a schematic diagram showing the configuration of a charge control system 1 according to the embodiment of the present invention. This charging control system 1 in FIG. 1 is constituted by an electronic wristwatch (electronic device) 10 and a reader/writer device 20. The electronic wristwatch 10 includes a solar panel 11 provided on its dial plate, and has a solar charging function for charging a battery 102 (refer to FIG. 2) by electrical power generated by the solar panel 11 receiving external light (sunlight). In addition, this electronic wristwatch 10 includes an NFC tag 12 so as to communicate with an NFC tag 21 in the reader/writer device 20, and has a wireless charging function for charging the battery 102 by part of electrical power drawn during NFC data communication. The reader/writer device 20 is an electronic device having the NFC tag 21, such as an automatic ticket gate, a payment device in a store or the like, a personal authentication device in a facility or the like, a smartphone, and a tablet computer.

In the case of the automatic ticket gate, the user passing through the automatic ticket gate holds the electronic wristwatch 10 over a predetermined pad on the automatic ticket gate, whereby NFC data communication is performed so that the recording of a departure station, a departure time, an alighting station, an alighting time, and the like, and the payment of a fare are performed. Also, in the case of the payment device in a store or the like, the user holds the electronic wristwatch 10 over a terminal unit for payment, whereby NFC data communication is performed so that payment by electronic money is performed. Moreover, in the case of the personal authentication device in a facility or the like, the user going into a facility requiring personal authentication holds the electronic wristwatch 10 over a reader device installed at the entrance, whereby NFC data communication is performed so that personal authentication is performed. Furthermore, in the case of the smartphone or tablet computer, a utilization method may be adopted in which an application (such as a map application) which should be started when the electronic wristwatch 10 is held over the smartphone or tablet computer is set in advance and, when NFC data communication is performed by the user holding the electronic wristwatch 10 over the smartphone or tablet computer, automatically started with this NFC data communication as a trigger (the reader/writer device 20 (external device) is controlled to perform predetermined processing).

As described above, NFC data communication between the reader/writer device 20 and the electronic wristwatch 10 is performed in a relatively short amount of time (in seconds). In the present embodiment, the battery 102 is charged by part of electrical power drawn during this short-term NFC data communication, as with the conventional wireless charge system described above. Here, the conventional wireless charge system has a problem in that battery charge may be repeatedly performed depending on the situation, which shortens the life of the battery. However, in the case of the present embodiment, battery charge by part of electrical power drawn during short-term NFC data communication can be suitably controlled and efficiently performed, whereby the battery 102 is not strained.

Figure 2:
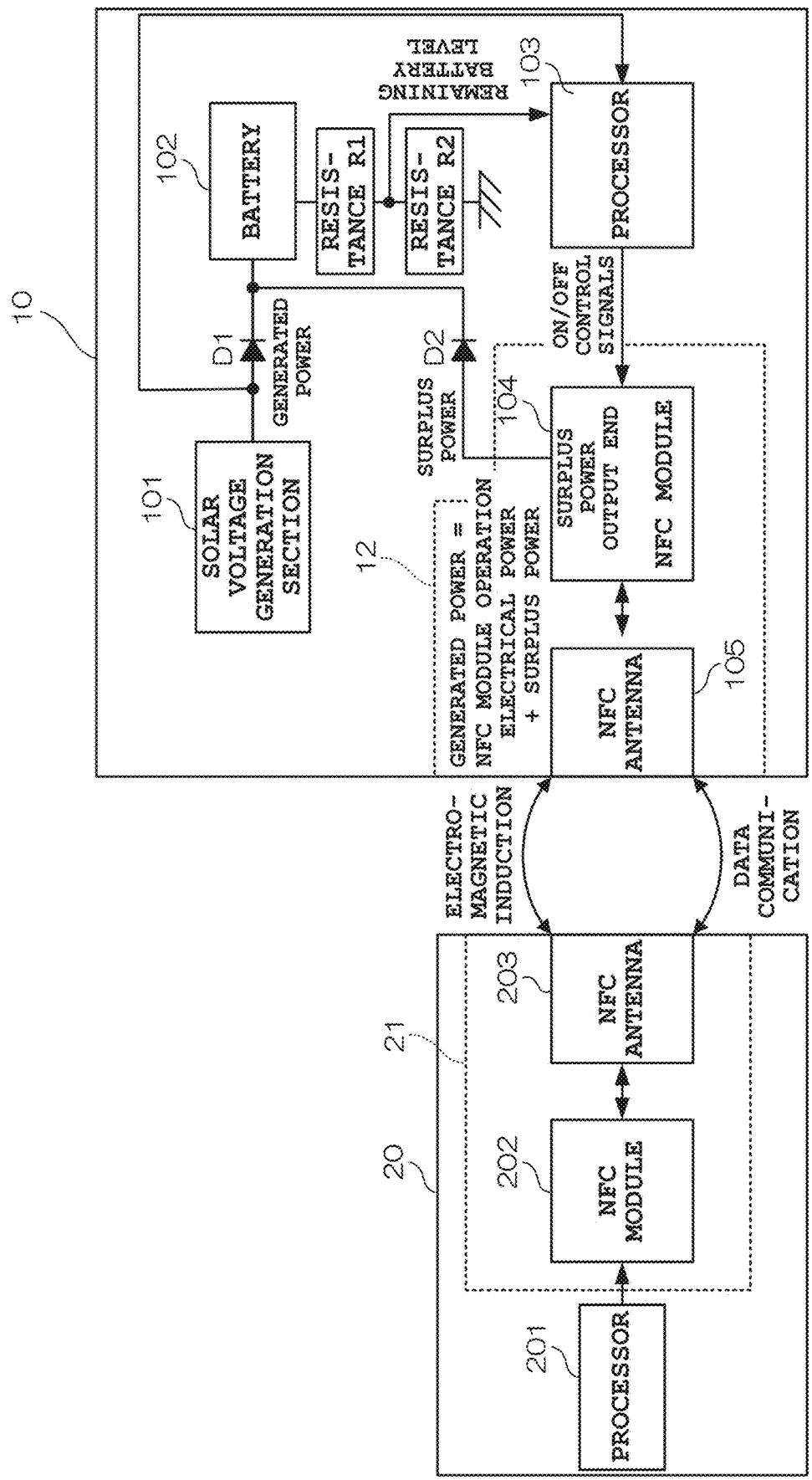
FIG. 2 is a block diagram showing the structure of an electronic wristwatch (electronic device) 10 and the structure of a reader/writer device 20 according to the embodiment of the present invention.

FIG. 2 is a block diagram showing the structure of the electronic wristwatch (electronic device) 10 and the structure of the reader/writer device 20 according to the embodiment of the present invention. The electronic wristwatch 10 includes a solar voltage generation section (solar power generation section) 101, the battery 102, a processor 103, an NFC module 104, an NFC antenna 105, and the like, as shown in FIG. 2. The solar voltage generation section 101 outputs electrical power generated by the solar panel 11, and this electrical power (output voltage) is provided to the battery 102 via a backflow prevention diode D1. The processor 103 outputs to the NFC module 104 an ON/OFF control signal which gives an instruction as to whether to output at least part (surplus electrical power) of electrical power generated in NFC data communication, on the basis of the output voltage of the solar voltage generation section 101 and/or the remaining battery level of the battery 102.

The above-described part (surplus electrical power) of electrical power is acquired by subtracting, from electrical power converted by the NFC module 104, electrical power used in the electronic wristwatch (electronic device) 10 so as to control the reader/writer device 20 to perform predetermined processing as a result of NFC data communication between the electronic wristwatch (electronic device) 10 and the reader/writer device 20. For example, in the case of the above-described NFC data communication with a personal authentication device in a facility or the like, a smartphone, or a tablet computer, the above-described part of electrical power is surplus electrical power acquired by subtracting, from electrical power converted by the NFC module 104, electrical power used in the electronic wristwatch (electronic device) 10 so as to control the reader/writer device 20 to perform predetermined processing (such as starting an application). Also, in the case of the above-described NFC data communication with an automatic ticket gate or a payment device in a store or the like, the above-described part of electrical power is surplus electrical power acquired by subtracting, from electrical power converted by the NFC module 104, electrical power used in the electronic wristwatch (electronic device) 10 to perform payment processing.

The NFC module 104 controls NFC data communication with the reader/writer device 20 by the NFC antenna 105. When NFC data communication with the reader/writer device 20 is started, electromagnetic induction occurs between the NFC antenna 105 and an NFC antenna 203 in the reader/writer device 20. By this electromagnetic induction, electrical power is generated at the NFC antenna 105, which exceeds NFC module operation electrical power for driving the NFC module 104 and includes surplus electrical power. Then, when an ON control signal is provided from the processor 103, the NFC module 104 outputs the surplus electrical power of the electrical power generated at the NFC antenna 105 from a surplus electrical power output end. This surplus electrical power is supplied to the battery 102 via a backflow prevention diode D2. As a result, the battery 102 is charged by the output voltage of the solar voltage generation section 101 and the surplus electrical power. Conversely, when an OFF control signal is provided from the processor 103, the NFC module 104 does not output the electrical power generated at the NFC antenna 105 from the surplus electrical power output end. As a result, the battery 102 is charged by only the output voltage of the solar voltage generation section 101.

In particular, in the present embodiment, if the remaining battery level of the battery 102 is extremely low when NFC data communication with the reader/writer device 20 is started, the processor 103 controls the NFC module 104 to charge the battery 102 by surplus electrical power resulting from the NFC regardless of whether or not battery charge by solar power generation is being performed. When the remaining battery level of the battery 102 is slightly low, the processor 103 controls the NFC module 104 to charge the battery 102 by surplus electrical power resulting from the NFC if battery charge by solar power generation is not being performed, and controls the NFC module 104 not to charge by surplus electrical power resulting from the NFC if battery charge by solar power generation is being performed. Also, when the remaining battery level of the battery 102 is relatively high, the processor 103 controls the NFC module 104 not to charge the battery 102 by surplus electrical power resulting from the NFC regardless of whether or not battery charge by solar power generation is being performed. Note that whether battery charge by solar power generation is being performed or not is determined on the basis of the output voltage of the solar voltage generation section 101. When the output voltage of the solar voltage generation section 101 is lower than a predetermined reference value, a determination is made that battery charge by solar power generation is not being performed. Conversely, when the output voltage of the solar voltage generation section 101 is equal to or higher than the predetermined reference value, a determination is made that battery charge by solar power generation is being performed.

As described above, in the present embodiment, when NFC data communication with the reader/writer device 20 is started, whether or not the battery 102 is charged by surplus electrical power that can be drawn in the NFC data communication is controlled on the basis of the output voltage of the solar voltage generation section 101 (whether or not battery charge by solar power generation is being performed) and/or the remaining battery level of the battery 102. As a result of this configuration, the battery 102 can be efficiently charged without being strained.

The reader/writer device 20 includes a processor 201, an NFC module 202, and the NFC antenna 203. The processor 201 controls the operations of the NFC module 202 in NFC data communication with the electronic wristwatch 10, and the NFC module 202 controls NFC data communication with the electronic wristwatch 10 by the NFC antenna 203.

Figure 3:
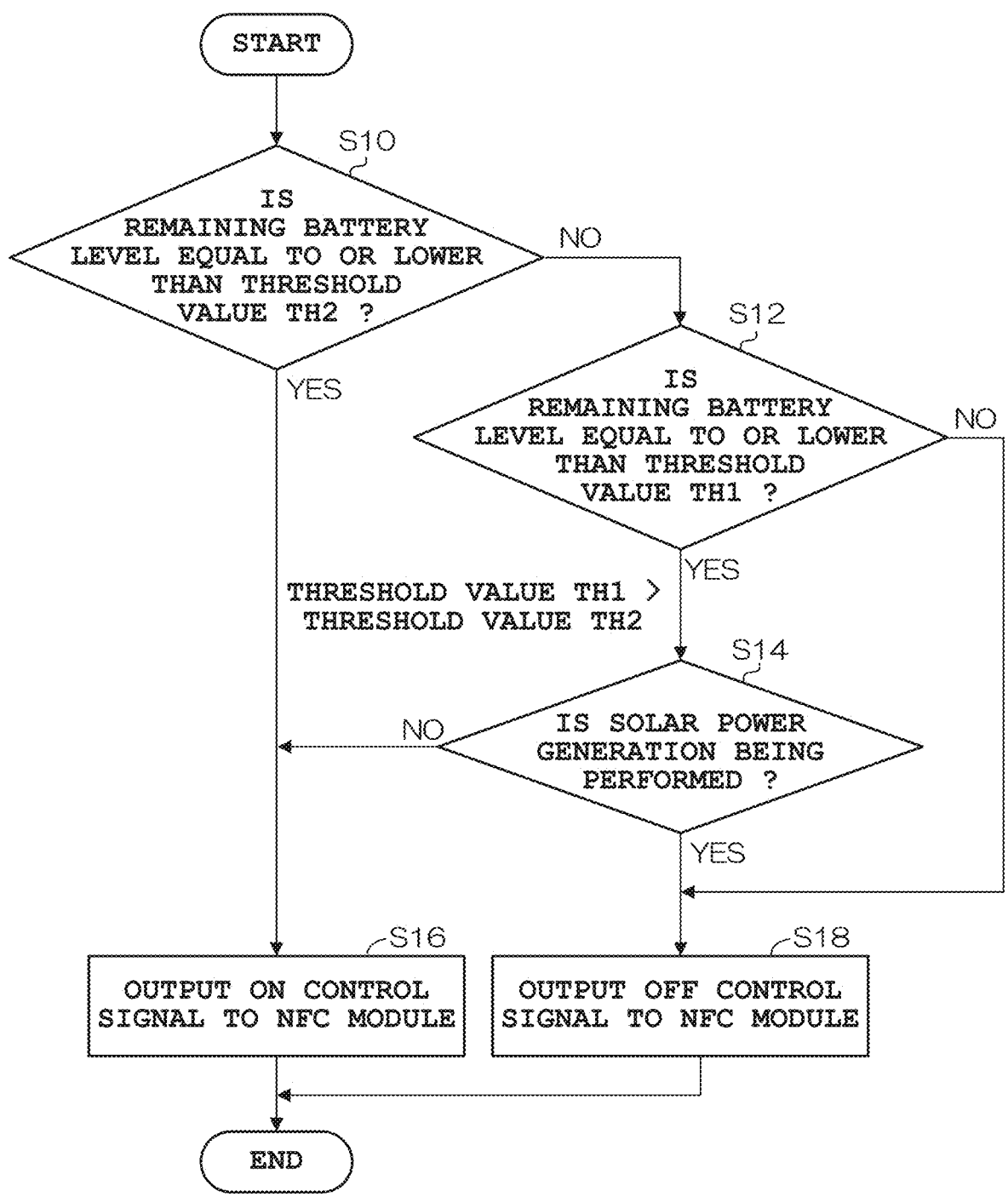
FIG. 3 is a flowchart for describing a charge control operation by the electronic wristwatch (electronic device) 10 according to the embodiment.
Figure 4A:
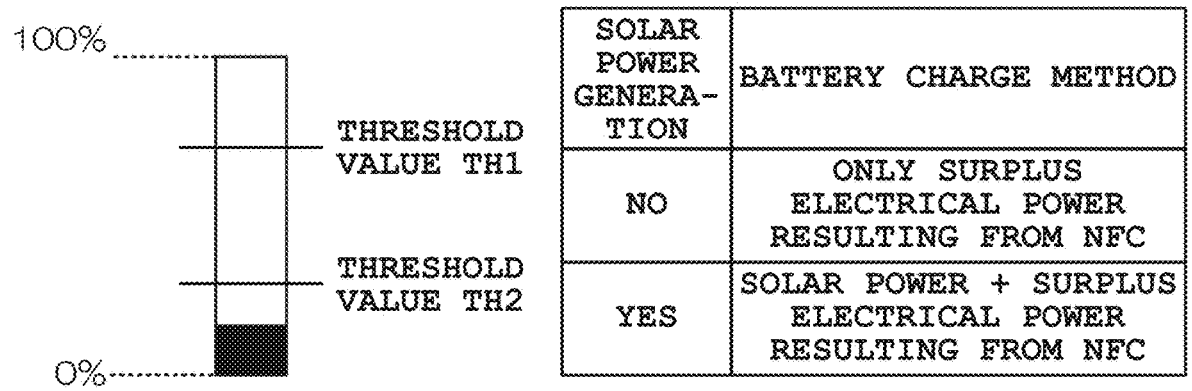
FIG. 4A to FIG. 4C are conceptual diagrams for describing the charge control operation by the electronic wristwatch (electronic device) 10 according to the embodiment.
Figure 4B:
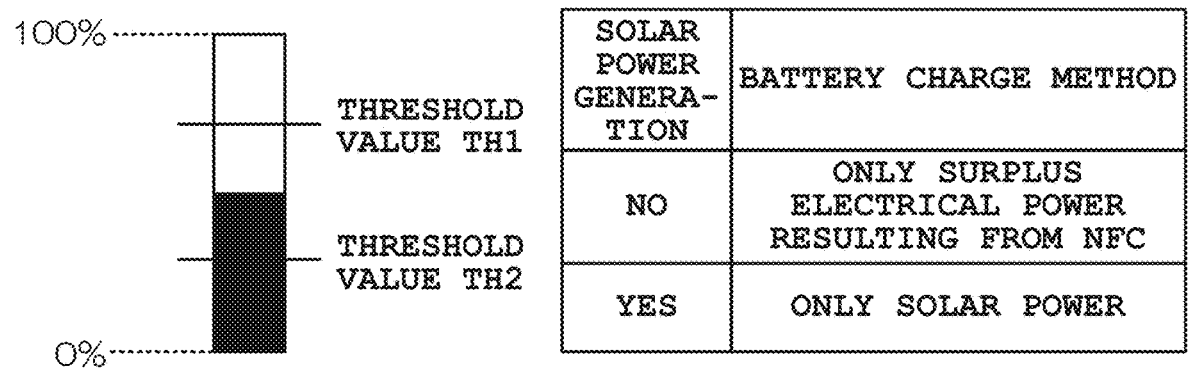
Figure 4C:
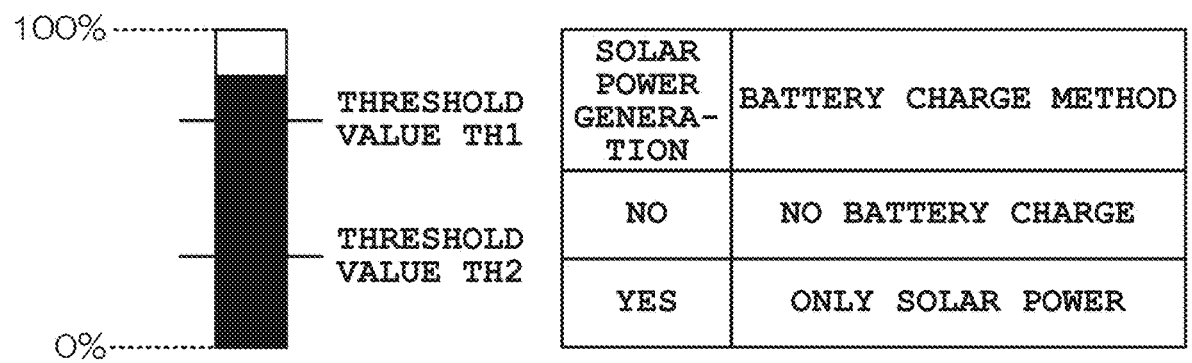

FIG. 3 is a flowchart for describing a charge control operation by the electronic wristwatch (electronic device) 10 according to the present embodiment, and FIG. 4A to FIG. 4C are conceptual diagrams for describing the charge control operation by the electronic wristwatch (electronic device) 10 according to the present embodiment. Note that, in the present embodiment, the processor 103 of the electronic wristwatch (electronic device) 10 determines the remaining battery level of the battery 102 by using a threshold value TH1 and a threshold value TH2 which have a relation of TH1>TH2. When supposing that the remaining battery level of the fully charged battery 102 is represented as 100% and the remaining battery level of the empty battery 102 is represented as 0%, the threshold value TH1 is about 70 to 80% and the threshold value TH2 is about 10 to 20%. However, the threshold value TH1 and the threshold value TH2 are not limited thereto.

First, the processor 103 determines whether or not the remaining battery level is equal to or lower than the threshold value TH2 with the start of NFC data communication with the reader/writer device 20 as a trigger (Step S10). When the remaining battery level is equal to or lower than the threshold value TH2 (YES at Step S10), the processor 103 outputs an ON control signal to the NFC module 104 (Step S16), as shown in FIG. 3. Then, in response to the ON control signal from the processor 103, the NFC module 104 outputs surplus electrical power of electrical power generated at the NFC antenna 105 from the surplus electrical power output end. This surplus electrical power is supplied to the battery 102 via the backflow prevention diode D2. In this case, regardless of whether or not solar power generation is being performed, the surplus electrical power resulting from the NFC is used to charge the battery 102. More specifically, when solar power generation is not being performed, the battery 102 is charged by only the surplus electrical power resulting from the NFC, as shown in FIG. 4A. When solar power generation is being performed, the battery 102 is charged by both electrical power generated by the solar power generation and the surplus electrical power resulting from the NFC. As such, in this case where the remaining battery level of the battery 102 is extremely low (such as equal to or lower than 10 to 20%), the battery 102 is charged by the surplus electrical power resulting from the NFC regardless of whether or not solar power generation is being performed.

At Step S10, when the remaining battery level is not equal to or lower than the threshold value TH2 (NO at Step S10), the processor 103 determines whether or not the remaining battery level is equal to or lower than the threshold value TH1 (Step S12). When the remaining battery level is higher than the threshold value TH2 and equal to or lower than the threshold value TH1 (YES at Step S12), the processor 103 determines whether or not solar power generation is being performed on the basis of the output voltage of the solar voltage generation section 101 (Step S14), as shown in FIG. 3. When solar power generation is not being performed (NO at Step S14), the processor 103 outputs an ON control signal to the NFC module 104 (Step S16).

Subsequently, in response to the ON control signal from the processor 103, the NFC module 104 outputs the surplus electrical power of the electrical power generated at the NFC antenna 105 from the surplus electrical power output end. This surplus electrical power is supplied to the battery 102 via the backflow prevention diode D2. Then, the battery 102 is charged by only the surplus electrical power resulting from the NFC, as shown in FIG. 4B. That is, in this case where the remaining battery level of the battery 102 is slightly low (such as higher than 10 to 20% and equal to or lower than 70 to 80%), and solar power generation is not being performed, the battery 102 is charged only by the surplus electrical power resulting from the NFC.

At Step S14, when the remaining battery level is higher than the threshold value TH2 and equal to or lower than the threshold value TH1, and solar power generation is being performed (YES at Step S14), the processor 103 outputs an OFF control signal to the NFC module 104 (Step S18), as shown in FIG. 3. Here, in accordance with the OFF control signal from the processor 103, the NFC module 104 does not output the surplus electrical power generated at the NFC antenna 105, and the battery 102 is charged by only solar electrical power, as shown in FIG. 4B. That is, in this case where the remaining battery level of the battery 102 is slightly low (such as higher than 10 to 20% and equal to or lower than 70 to 80%), and solar power generation is being performed, the battery 102 is charged by only the solar electrical power without using the surplus electrical power resulting from the NFC.

At Step S10 and Step S12, when the remaining battery level is not equal to or lower than the threshold value TH2 and not equal to or lower than the threshold value TH1 (NO at Step S10 and Step S12), the processor 103 outputs an OFF control signal to the NFC module 104 (Step S18), as shown in FIG. 3. Accordingly, in accordance with the OFF control signal from the processor 103, the NFC module 104 does not output the surplus electrical power generated at the NFC antenna 105. Here, if solar power generation is being performed, the battery 102 is charged by only solar electrical power, as shown in FIG. 4C. If solar power generation is not being performed, the battery 102 is not charged. That is, in this case where the remaining battery level of the battery 102 is relatively high (such as higher than 70 to 80%), the surplus electrical power resulting from the NFC is not used, and the battery 102 is charged by solar electrical power if solar power generation is being performed, and not charged if solar power generation is not being performed.

In the above-described embodiment, the outputting of ON or OFF control signals to the NFC module 104 requires determination as to the remaining battery level of the battery 102 regardless of whether or not battery charge by solar power generation is being performed. However, a configuration may be adopted in which whether or not battery charge by solar power generation is being performed is determined before the remaining battery level of the battery 102 is determined, and an OFF control signal is outputted to the NFC module 104 when battery charge by solar power generation is being performed.

Also, in the above-described embodiment, whether or not battery charge by solar power generation is being performed is determined based on whether or not the output voltage of the solar voltage generation section 101 is equal to or higher than the predetermined reference value. However, the present invention is not limited thereto, and a configuration may be adopted in which a determination that solar power generation is being performed is made when an intensity of illumination equal to or higher than a threshold value is detected by an illumination sensor.

Moreover, in the above-described embodiment, the battery 102 is charged by electrical power generated by solar power generation. However, the electronic wristwatch 10 may have a charging function using a wireless charging system or a USB (Universal Serial Bus) charging system in addition to the charging function using solar power generation, Furthermore, the present embodiment may have a structure which further includes a boost converter that increases output voltage from the NFC module 104 or the solar voltage generation section 101 when the output voltage is low and the charge voltage of the battery 102 is insufficient, or a structure which further includes a back converter that decreases the output voltage when the output voltage is much higher than the charge voltage.

Still further, in the present embodiment, the charge control method has been adopted for the case where the electronic wristwatch 10 and the reader/writer device 20 perform NFC data communication for a relatively short period of time. However, the present invention is not limited thereto, and the charge control method of the present embodiment may be adopted for a case where the electronic wristwatch 10 and a smartphone, a tablet computer, a personal computer, or the like perform NFC data communication for a relatively long period of time. In the case of the charge control in NFC data communication for a relatively long period of time as well, a similar advantageous effect can be acquired. That is, battery charge can be efficiently performed, whereby the battery 102 is not strained. In this case, since NFC data communication is performed for a relatively long period of time, a configuration may be adopted in which display indicating that the electronic wristwatch 10 is being charged is performed on a smartphone, a tablet computer, a personal computer, or the like with the start of NFC data communication as a trigger.

In the present embodiment, battery charge for the battery 102 by surplus electrical power resulting from NFC data communication is controlled based on whether or not the predetermined conditions have been satisfied. As a result of this configuration, the battery 102 can be charged for a short period of time at suitable timing, whereby battery depletion does not easily occur, and a frequent repeat of battery charge which shortens the battery life can be prevented.

Also, in the present embodiment, when the remaining battery level of the battery 102 is higher than the threshold value TH1, the charge of the battery 102 by surplus electrical power resulting from NFC data communication is not performed. As a result of this configuration, a frequent repeat of battery charge which shortens the battery life can be prevented.

Moreover, in the present embodiment, when the remaining battery level of the battery 102 is equal to or lower than the threshold value TH2 which is smaller the than threshold value TH1, the battery 102 is charged by surplus electrical power resulting from NFC data communication. As a result of this configuration, battery depletion does not easily occur, and a frequent repeat of battery charge which shortens the battery life can be prevented.

Furthermore, in the present embodiment, when the remaining battery level of the battery 102 is equal to or lower than the threshold value TH1 and higher than the threshold value TH2, the battery 102 is charged by surplus electrical power resulting from NFC data communication. As a result of this configuration, battery depletion does not easily occur, and a frequent repeat of battery charge which shortens the battery life can be prevented.

Still further, in the present embodiment, when electrical power generated by the solar voltage generation section 101 is being provided to the battery 102, the charge of the battery 102 by surplus electrical power resulting from NFC data communication is not performed. As a result of this configuration, battery depletion does not easily occur, and a frequent repeat of battery charge which shortens the battery life can be prevented.

Yet still further, in the present embodiment, when the remaining battery level of the battery 102 is higher than the threshold value TH1 and electrical power generated by the solar voltage generation section 101 is not being provided to the battery 102, the battery 102 is not charged. As a result of this configuration, battery depletion does not easily occur by the suitable battery charge method, and a frequent repeat of battery charge which shortens the battery life can be prevented.

Figure 5:
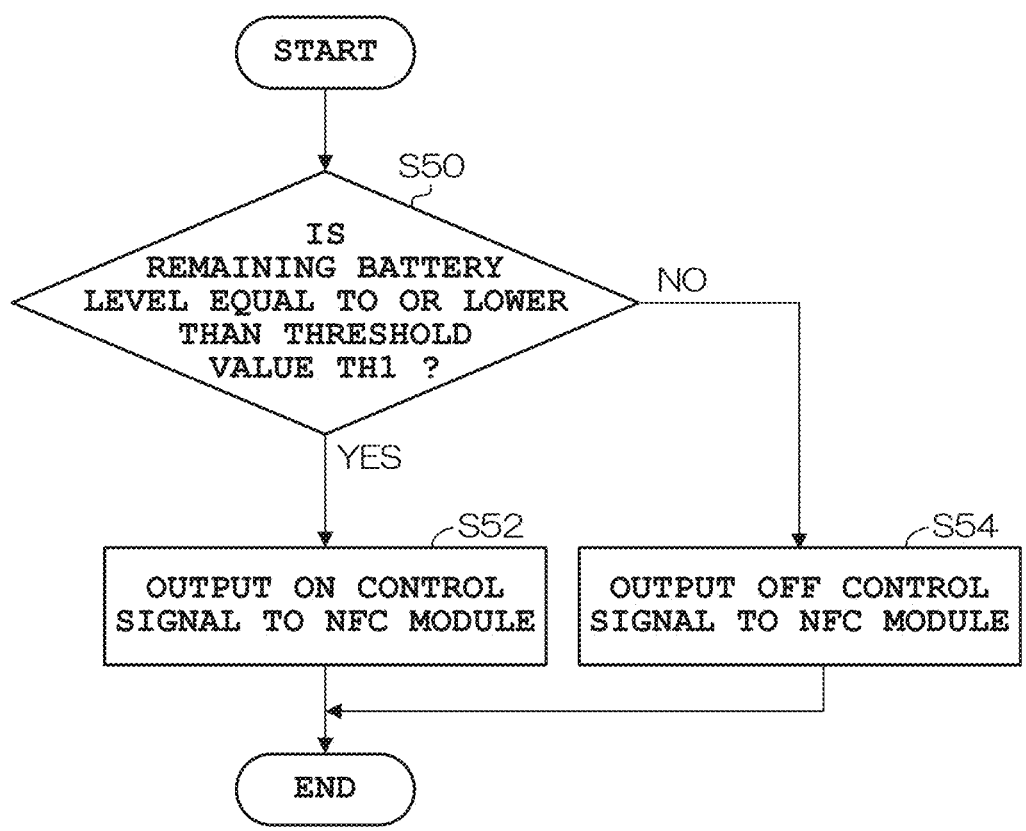
FIG. 5 is a flowchart for describing a charge control operation by the electronic wristwatch (electronic device) 10 in a modification example of the embodiment.

This also applies to a configuration which is different from that of the present embodiment and in which ON or OFF control signals are outputted to the NFC module 104 based only on a result of determination as to the remaining battery level of the battery 102 regardless of whether or not battery charge by solar power generation is being performed. FIG. 5 is a flowchart for describing charging control by the processor 103 in a modification example having this configuration. First, the processor 103 determines whether or not the remaining battery level is equal to or lower than threshold value TH1 with the start of NFC data communication with the reader/writer device 20 as a trigger (Step S50). When the remaining battery level is equal to or lower than the threshold value TH1 (YES at Step S50), the processor 103 immediately outputs an ON control signal to the NFC module 104 (Step S52). Conversely, when the remaining battery level is not equal to or lower than the threshold value TH1 (NO at Step S50), the processor 103 immediately outputs an OFF control signal to the NFC module 104 (Step S54).

Also, in the present embodiment, when the remaining battery level of the battery 102 is equal to or lower than the threshold value TH2 which is smaller than the threshold value TH1, the battery 102 is charged by both electrical power generated by the solar voltage generation section 101 and surplus electrical power resulting from NFC data communication such that the life of the battery 102 is not shortened. As a result of this configuration, the battery 102 can be quickly charged even when the remaining battery level is extremely low.

Moreover, in the present embodiment, when the remaining battery level of the battery 102 is equal to or lower than the threshold value TH1 and higher than the threshold value TH2, the battery 102 is charged by surplus electrical power resulting from NFC data communication if electrical power generated by the solar voltage generation section 101 is not being provided to the battery 102, or is not charged by surplus electrical power resulting from NFC data communication if electrical power generated by the solar voltage generation section 101 is being provided to the battery 102. As a result of this configuration, battery depletion does not easily occur by the suitable battery charge method, and a frequent repeat of battery charge which shortens the battery life can be prevented.

Furthermore, in the present embodiment, whether or not electrical power generated by the solar voltage generation section 101 is being provided to the battery 102 is determined based on whether or not the output voltage of the solar voltage generation section 101 is equal to or higher than the predetermined reference value. As a result of this configuration, battery depletion does not easily occur by the suitable battery charge method, and a frequent repeat of battery charge which shortens the battery life can be prevented.

Still further, the above-described surplus electrical power resulting from NFC data communication in the present embodiment and the modification example is electrical power acquired by subtracting, from electrical power converted by the NFC module 104, electrical power used to control the reader/writer device 20 (external device) to perform predetermined processing as a result of NFC data communication with the reader/writer device 20. As a result of this configuration, the battery 102 can be charged such that usual operations by the electronic wristwatch 10 are not interrupted and the life of the battery 102 is not shortened.

Yet still further, the above-described surplus electrical power resulting from NFC data communication in the present embodiment and the modification example is also electrical power acquired by subtracting, from electrical power converted by the NFC module 104, electrical power used to control the reader/writer device 20 (external device) to perform payment processing as a result of NFC data communication with the reader/writer device 20. As a result of this configuration, the battery 102 can be charged such that usual payment operations by the electronic wristwatch 10 are not interrupted and the life of the battery 102 is not shortened.

Yet still further, the detailed structure and detailed operation of each component of the charging control system 1 in the above-described embodiment can be appropriately changed within the scope of the present invention.

While the present invention has been described with reference to the preferred embodiments, it is intended that the invention be not limited by any of the details of the description therein but includes all the embodiments which fall within the scope of the appended claims.

What is claimed is:

1. An electronic device comprising:
   an antenna which is used for near field communication and converts to electrical power a magnetic field generated when near field communication is performed with an external device;
   a battery which is chargeable by at least part of the electrical power; and
   a processor which determines whether or not a predetermined condition has been satisfied, and controls charge of the battery by the part of the electrical power on basis of a result of the determination,
   wherein the part of the electrical power is surplus electrical power acquired by subtracting, from the electrical power acquired by the conversion by the antenna for near field communication, electrical power used by the electronic device to control the external device to perform predetermined processing as a result of near field communication between the electronic device and the external device.

2. The electronic device according to claim 1, wherein the processor sets, as the predetermined condition, a condition that a remaining battery level of the battery is higher than a first threshold value, and controls such that the charge of the battery by the part of the electrical power is not performed when a determination is made that the predetermined condition has been satisfied.

3. The electronic device according to claim 1, wherein the processor sets, as the predetermined condition, a condition that a remaining battery level of the battery is equal to or lower than a first threshold value, and controls such that the charge of the battery by the part of the electrical power is performed when a determination is made that the predetermined condition has been satisfied.

4. The electronic device according to claim 1, further comprising:
   a solar power generation section which generates electrical power by external light,
   wherein the processor sets, as the predetermined condition, a condition that the electrical power generated by the solar power generation section is being provided to the battery, and controls such that the charge of the battery by the part of the electrical power is not performed when a determination is made that the predetermined condition has been satisfied.

5. The electronic device according to claim 4, wherein the processor determines whether or not the electrical power generated by the solar power generation section is being provided to the battery, based on whether or not an output voltage of the solar power generation section is equal to or higher than a predetermined reference value.

6. The electronic device according to claim 1, further comprising:
   a solar power generation section which generates electrical power by external light,
   wherein the processor sets, as the predetermined condition, a condition that a remaining battery level of the battery is higher than a first threshold value, and controls such that charge of the battery is not performed when a determination is made that the predetermined condition has been satisfied and the electrical power generated by the solar power generation section is not being provided to the battery.

7. The electronic device according to claim 1, further comprising:
   a solar power generation section which generates electrical power by external light,
   wherein the processor sets, as the predetermined condition, a condition that a remaining battery level of the battery is equal to or lower than a second threshold value smaller than a first threshold value, and controls such that the charge of the battery by the part of the electrical power is performed when a determination is made that the predetermined condition has been satisfied and the electrical power generated by the solar power generation section is not being provided to the battery, or charge of the battery by both the electrical power generated by the solar power generation section and the part of the electrical power is performed when a determination is made that the predetermined condition has been satisfied and the electrical power generated by the solar power generation section is being provided to the battery.

8. The electronic device according to claim 1, further comprising:
   a solar power generation section which generates electrical power by external light,
   wherein the processor sets, as the predetermined condition, a condition that a remaining battery level of the battery is equal to or lower than a first threshold value and higher than a second threshold value smaller than the first threshold value, and controls such that the charge of the battery by the part of the electrical power is performed when a determination is made that the predetermined condition has been satisfied and the electrical power generated by the solar power generation section is not being provided to the battery, or the charge of the battery by the part of the electrical power is not performed when a determination is made that the predetermined condition has been satisfied and the electrical power generated by the solar power generation section is being provided to the battery.

9. The electronic device according to claim 1, wherein the predetermined processing is payment processing which the external device is controlled to perform.

10. A charge control method by a processor of an electronic device, comprising:
    converting to electrical power a magnetic field generated when near field communication is performed with an external device; and determining whether or not a predetermined condition has been satisfied, and controlling charge of a battery by at least part of the electrical power on basis of a result of the determination, wherein the part of the electrical power is surplus electrical power acquired by subtracting, from the electrical power acquired by the conversion by an antenna for near field communication, electrical power used by the electronic device to control the external device to perform predetermined processing as a result of near field communication between the electronic device and the external device.

11. The charge control method according to claim 10, wherein the electronic device further comprises a solar power generation section which generates electrical power by external light, and wherein the processor of the electronic device sets, as the predetermined condition, a condition that the electrical power generated by the solar power generation section is being provided to the battery, and controls such that the charge of the battery by the part of the electrical power is not performed when a determination is made that the predetermined condition has been satisfied.

12. The charge control method according to claim 10, wherein the electronic device further comprises a solar power generation section which generates electrical power by external light, and wherein the processor of the electronic device sets, as the predetermined condition, a condition that a remaining battery level of the battery is higher than a first threshold value, and controls such that charge of the battery is not performed when a determination is made that the predetermined condition has been satisfied and the electrical power generated by the solar power generation section is not being provided to the battery.

13. The charge control method according to claim 10, wherein the electronic device further comprises a solar power generation section which generates electrical power by external light, and wherein the processor of the electronic device sets, as the predetermined condition, a condition that a remaining battery level of the battery is equal to or lower than a second threshold value smaller than a first threshold value, and controls such that the charge of the battery by the part of the electrical power is performed when a determination is made that the predetermined condition has been satisfied and the electrical power generated by the solar power generation section is not being provided to the battery, or charge of the battery by both the electrical power generated by the solar power generation section and the part of the electrical power is performed when a determination is made that the predetermined condition has been satisfied and the electrical power generated by the solar power generation section is being provided to the battery.

14. The charge control method according to claim 10, wherein the electronic device further comprises a solar power generation section which generates electrical power by external light, and wherein the processor of the electronic device sets, as the predetermined condition, a condition that a remaining battery level of the battery is equal to or lower than a first threshold value and higher than a second threshold value smaller than the first threshold value, and controls such that the charge of the battery by the part of the electrical power is performed when a determination is made that the predetermined condition has been satisfied and the electrical power generated by the solar power generation section is not being provided to the battery, or the charge of the battery by the part of the electrical power is not performed when a determination is made that the predetermined condition has been satisfied and the electrical power generated by the solar power generation section is being provided to the battery.

15. A non-transitory computer-readable storage medium having stored thereon a program that is executable by a processor of an electronic device which performs near field communication with an external device, the program being executable by the processor to actualize functions comprising:

determining whether or not a predetermined condition has been satisfied, and controlling charge of a battery by at least part of electrical power acquired by conversion of a magnetic field generated when the near field communication is performed, on basis of a result of the determination, wherein the part of the electrical power is surplus electrical power acquired by subtracting, from the electrical power acquired by the conversion by an antenna for near field communication, electrical power used by the electronic device to control the external device to perform predetermined processing as a result of near field communication between the electronic device and the external device.

16. The non-transitory computer-readable storage medium according to claim 15, wherein the electronic device further comprises a solar power generation section which generates electrical power by external light, and wherein the processor of the electronic device sets, as the predetermined condition, a condition that the electrical power generated by the solar power generation section is being provided to the battery, and controls such that the charge of the battery by the part of the electrical power is not performed when a determination is made that the predetermined condition has been satisfied.

17. The non-transitory computer-readable storage medium according to claim 15, wherein the electronic device further comprises a solar power generation section which generates electrical power by external light, and wherein the processor of the electronic device sets, as the predetermined condition, a condition that a remaining battery level of the battery is higher than a first threshold value, and controls such that charge of the battery is not performed when a determination is made that the predetermined condition has been satisfied and the electrical power generated by the solar power generation section is not being provided to the battery.

18. The non-transitory computer-readable storage medium according to claim 15, wherein the electronic device further comprises a solar power generation section which generates electrical power by external light, and wherein the processor of the electronic device sets, as the predetermined condition, a condition that a remaining battery level of the battery is equal to or lower than a second threshold value smaller than a first threshold value, and controls such that the charge of the battery by the part of the electrical power is performed when a determination is made that the predetermined condition has been satisfied and the electrical power generated by the solar power generation section is not being provided to the battery, or charge of the battery by both the electrical power generated by the solar power generation section and the part of the electrical power is performed when a determination is made that the predetermined condition has been satisfied and the electrical power generated by the solar power generation section is being provided to the battery.

19. The non-transitory computer-readable storage medium according to claim 15, wherein the electronic device further comprises a solar power generation section which generates electrical power by external light, and wherein the processor of the electronic device sets, as the predetermined condition, a condition that a remaining battery level of the battery is equal to or lower than a first threshold value and higher than a second threshold value smaller than the first threshold value, and controls such that the charge of the battery by the part of the electrical power is performed when a determination is made that the predetermined condition has been satisfied and the electrical power generated by the solar power generation section is not being provided to the battery, or the charge of the battery by the part of the electrical power is not performed when a determination is made that the predetermined condition has been satisfied and the electrical power generated by the solar power generation section is being provided to the battery.

\* \* \* \* \*